United States Patent [19]

Pipkin

[11] 4,399,167

[45] Aug. 16, 1983

[54] METAL COATING OF ABRASIVE PARTICLES

[76] Inventor: Noel J. Pipkin, 24 Mackenzie St., Florida Park, Roodepoort, Transvaal, South Africa

[21] Appl. No.: 233,882

[22] Filed: Feb. 12, 1981

Related U.S. Application Data

[63] Continuation of Ser. No. 17,721, Mar. 5, 1979, abandoned.

[30] Foreign Application Priority Data

Mar. 9, 1978 [ZA] South Africa ..................... 78/1390

[51] Int. Cl.³ .............................................. B05D 7/00
[52] U.S. Cl. ..................................... 427/217; 51/295; 51/309; 427/250; 427/294
[58] Field of Search ................... 51/295, 309; 427/180, 427/217, 294, 250

[56] References Cited

U.S. PATENT DOCUMENTS

| 1,536,524 | 5/1925 | Pfersdorff | 427/180 |
|---|---|---|---|
| 2,853,401 | 9/1958 | Mackiw et al. | 427/217 |
| 3,061,462 | 10/1962 | Samuel | 427/217 |
| 3,650,714 | 3/1972 | Farkas | 51/295 |
| 3,853,582 | 12/1974 | Labossier | 427/217 |
| 3,924,031 | 12/1975 | Nicholas et al. | 51/295 |
| 3,950,596 | 4/1976 | Carr | 427/180 |
| 4,011,064 | 3/1977 | Lee et al. | 51/295 |
| 4,062,660 | 12/1977 | Nicholas et al. | 51/295 |
| 4,063,907 | 12/1977 | Lee et al. | 51/295 |

FOREIGN PATENT DOCUMENTS

| 460350 | 9/1945 | Belgium . | |
|---|---|---|---|
| 2647900 | 4/1978 | Fed. Rep. of Germany | 427/217 |
| 1187984 | 4/1970 | United Kingdom . | |
| 526678 | 10/1976 | U.S.S.R. | 427/217 |

*Primary Examiner*—Shrive P. Beck
*Attorney, Agent, or Firm*—Cushman, Darby & Cushman

[57] ABSTRACT

The invention provides a method of metal coating diamond or cubic boron nitride particles, the metal being capable of forming a chemical bond with the particles, including the steps of providing a mass of metal for the coating in powdered form in contact with the particles, heat treating the metal powder and the particles at a temperature below the melting point of the metal to deposit a layer of metal on the particles, and recovering the particles as discrete, metal coated particles, the heat treatment taking place in a non-oxidizing atmosphere and being chosen to allow chemical bond formation between the particles and the coating.

8 Claims, No Drawings

METAL COATING OF ABRASIVE PARTICLES

This is a continuation, of application Ser. No. 17,721 filed Mar. 5, 1979 now abandoned.

FIELD OF THE INVENTION

This invention relates to the metal coating of abrasive particles and in particular to the metal coating of cubic boron nitride and diamond particles.

DESCRIPTION OF PRIOR ART

It is known in the art that the metal coating of abrasive particles such as diamond and cubic boron nitride improves the retention of such particles in the matrices of various abrasive tools. In particular, it is known that the retention of diamond and cubic boron nitride particles in resin matrices is improved by providing the particles with a metal, particularly a nickel, coating.

It is also known in the art that the retention of diamonds of the metal bond or saw type in metal matrices can be improved by providing the particles with a double layer coating, the inner layer adjacent the particle being a carbide former such as titanium and the outer layer being a metal which alloys with the carbide former.

The metal coating of the particles may be achieved by a variety of methods depending on the nature of the metal coating. The coating may be applied electrolytically, electrolessly or by vacuum deposition. In the case of carbide formers the most practical method of coating the particles known to date has been that of vacuum deposition.

SUMMARY OF THE INVENTION

According to the invention, there is provided a method of metal coating diamond or cubic boron nitride particles, the metal being capable of forming a chemical bond with the particles, including the steps of providing a mass of metal for the coating in powdered form in contact with the particles, heat treating the metal powder and the particles at a temperature below the melting point of the metal to deposit a layer of the metal on to the particles, and recovering the particles as discrete, metal coated particles, the heat treatment taking place in a non-oxidising atmosphere and being chosen to allow chemical bond formation between the particles and the coating.

DESCRIPTION OF PREFERRED EMBODIMENTS

The abrasive particles and powdered metal will generally be provided in the form of a mixture with the abrasive particles being substantially uniformly distributed through a mass of metal powder.

The metal must be capable of forming a chemical bond with the abrasive particles. This means that the metal must be capable of forming carbides with the diamond and borides or nitrides with the cubic boron nitride. Typical examples of such metals are titanium, manganese, chromium, vanadium, tungsten, molybdenum and niobium. The metal is preferably chosen such that it will produce a stable chemical bond with the abrasive particles at a relatively low temperature i.e. temperatures not exceeding 1000° C. If the heat treatment is carried out at too high a temperature, the risks of deterioration of the abrasive particles dueing heat treatment are increased.

The heat treatment takes place at a temperature which is below the melting point of the metal. Thus, there is minimal sintering of the metal. The coated particles are recovered in discrete form by breaking up the loosely sintered mass e.g. by milling.

The heat treatment generally involves raising the temperature of the powdered metal and particles to a temperature which will vary according to the metal being coated and then maintaining this elevated temperature for a period sufficient to allow the metal to deposit onto the particles and bond thereto.

The period of heat treatment, as a general rule, will be less than 60 minutes. The coating thickness will generally not exceed a few microns, i.e. less than 5 microns.

By way of example the following conditions may be cited as producing coatings of up to 1 microns in thickness:

| Metal | Temperature | Time |
|---|---|---|
| Titanium | 700° C. | 30 mins. |
| Manganese | 700° C. | 30 mins. |
| Chromium | 1000° C. | 30 mins. |

The heat treatment takes place in a non-oxidising atmosphere. This atmosphere is necessary to inhibit deterioration of the abrasive particles during the heat treatment. The non-oxidising atmosphere may be provided by a inert gas such as argon and neon or by a vacuum of $10^{-4}$ Torr or better.

The metal powder will generally have a particle size in the range 125 to 37 microns, typically in the range 88 to 74 microns.

In an example of the invention diamond particles of the metal bond type were mixed with titanium powder of size 170/200 U.S. Mesh. The metal powder constituted about 70% by volume of the mixture. The mixture was then heated to a temperature of 700° C. in a vacuum of $10^{-4}$ Torr and maintained at this temperature for a period of 30 minutes. The temperature was allowed to return to ambient conditions and the vacuum released. The heated treated mixture was milled and then passed through an appropriate sieve which trapped the larger metal coated diamond particles and allowed the finer titanium to pass therethrough. The diamond particles were found each to have a titanium coating of thickness about 0,5 microns. The titanium coating was bonded to the diamond by means of a titanium carbide bonding layer. The method produced titanium coated diamond particles in an effective and simple manner.

I claim:

1. A method of metal coating diamond or cubic boron nitride particles, the metal being selected from the group consisting of titanium, manganese, chromium, vanadium, tungsten, molybdenum and niobium and being capable of forming a chemical bond with the particles, including the steps of providing a mass of metal for the coating in powdered form, of particle size in the range 125 to 37 microns and without having been subjected to an oxidation treatment, in contact with the particles so as to form a mixture consisting essentially of metal powder and the diamond or cubic boron nitride particles, with the metal powder present in a greater volume than the particles and with the particles being substantially uniformly distributed through the mass of metal powder, heat treating the metal powder and the particles in a non-oxidizing atmosphere at a temperature below the melting point of the metal by elevating the temperature of the powdered metal and the particles and maintaining the elevated temperature for a period of time sufficient to produce a loosely sintered mass and to allow the metal to deposit onto the particles and chemically bond thereto, and thereafter breaking up the loosely sintered mass and separating the metal-coated abrasive particles from the remaining metal particles.

2. A method of coating diamond particles with titanium including the steps of providing a mass of titanium in powdered form of particle size in the range 125 to 37 microns in contact with the particles so as to form a mixture consisting essentially of titanium powder and the diamond or cubic boron nitride particles, with the metal powder present in a greater volume than the particles and with the particles being substantially uniformly distributed through the mass of metal powder, heat treating the mixture of titanium and diamond particles at a temperature below the melting point of titanium by elevating the temperature of the powdered titanium and the particles and maintaining the elevated temperature for a period of time sufficient to produce a loosely sintered mass and to allow the titanium to deposit onto the particles and chemically bond thereto, and thereafter breaking up the loosely sintered mass and separating the titanium-coated particles from the remaining titanium particles.

3. A method of metal coating abrasive particles of diamond or cubic boron nitride comprising: forming a mixture of the particles with a mass of powdered metal selected from the group consisting of titanium, manganese, chromium, vanadium, tungsten, molybdenum and niobium of particle size smaller than the abrasive particle size, such that the mixture consists essentially of the powdered metal and the abrasive particles, with the metal powder present in a greater volume than the particles and such that the abrasive particles are substantially uniformly distributed through the mass of metal powder; heating the mixture in a non-oxidising atmosphere to an elevated temperature below the melting point of the metal and sufficient to produce a loosely sintered mass and maintaining the elevated temperature for a period of time sufficient to allow the metal to deposit onto the particles and chemically bond thereto; and thereafter breaking up the loosely sintered mass and separating the metal-coated abrasive particles from the remaining metal particles.

4. A method according to any one of claims 1, 2 or 3 wherein the temperature of heat treatment does not exceed 1000° C.

5. A method according to any one of claims 1, 2 or 3 wherein the elevated temperature is maintained for a period of less than 60 minutes.

6. A method according to any one of claims 1, 2 or 3 wherein the elevated temperature is maintained for a period of about 30 minutes.

7. A method according to any one of claims 1, 2 or 3 wherein the non-oxidising atmosphere is an inert gas or vacuum of $10^{-4}$ Torr or higher.

8. A method according to any one of claims 1, 2 or 3 wherein the metal powder has a particle size in the range 88 to 74 microns.